US012656216B2

(12) United States Patent
Kim

(10) Patent No.: US 12,656,216 B2
(45) Date of Patent: Jun. 16, 2026

(54) FAILURE DETERMINATION SYSTEM FOR A LIGHTING APPARATUS

(71) Applicants:HYUNDAI MOTOR COMPANY, Seoul (KR); KIA CORPORATION, Seoul (KR)

(72) Inventor: Hyeong Seon Kim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 130 days.

(21) Appl. No.: 18/609,805

(22) Filed: Mar. 19, 2024

(65) Prior Publication Data

US 2025/0116569 A1 Apr. 10, 2025

(30) Foreign Application Priority Data

Oct. 5, 2023 (KR) ........................ 10-2023-0132744

(51) Int. Cl.
G01M 11/02 (2006.01)
B60Q 11/00 (2006.01)

(52) U.S. Cl.
CPC ....... G01M 11/0257 (2013.01); B60Q 11/005 (2013.01)

(58) Field of Classification Search
CPC ........... G01M 11/0257; G01M 11/005; G01M 11/02; B60Q 11/005; B60Q 2300/146; B60Q 2400/50; B60Q 11/00; H05B 47/20; H05B 47/11; F21S 41/30; F21V 23/0464; G01J 1/00; G09F 9/33; G09G 3/00

USPC ................... 356/436–448, 124, 237.2–237.6
See application file for complete search history.

(56) References Cited

U.S. PATENT DOCUMENTS

| | | | |
|---|---|---|---|
| 10,259,380 B2 | 4/2019 | Ko et al. | |
| 2015/0043001 A1* | 2/2015 | Ishimaru | A61B 5/14532 |
| | | | 600/316 |
| 2015/0260573 A1* | 9/2015 | Ishimaru | A61B 5/14532 |
| | | | 356/451 |
| 2017/0282786 A1* | 10/2017 | Toda | F21S 41/148 |
| 2017/0328533 A1 | 11/2017 | Ko et al. | |
| 2018/0043820 A1* | 2/2018 | Murakami | H05B 45/14 |

FOREIGN PATENT DOCUMENTS

KR 101795253 B1 11/2017

* cited by examiner

*Primary Examiner* — Isiaka O Akanbi
(74) *Attorney, Agent, or Firm* — Lempia Summerfield Katz LLC

(57) ABSTRACT

A failure determination system for a lighting apparatus determines whether a reflection unit has failed. In particular, the reflection unit forms a projected image by reflecting off light emitted from a light source. The system provides the normalization of the reflection unit and enables to maintain the visibility of the projected image.

14 Claims, 4 Drawing Sheets

FIG. 3

| DMD | LED | Temperature senser | Optical sensor calculation | Comparison to failure reference value | Result value |
|---|---|---|---|---|---|
| On | ON | 25℃ | 0(No mirror failure)/1382(25℃ Max) → 0% | 0% < 20% | Normal |
| On | ON | 25℃ | 238(Some light is measured by optical sensor because of mirror failure) /1382(25℃ Max) → 17% | 17% < 20% | Normal |
| On | ON | 25℃ | 277(Some light is measured by optical sensor because of mirror failure) /1382(25℃ Max) → 21% | 21% > 20% | Abnormal |
| On | ON | 55℃ | 238(Some light is measured by optical sensor because of mirror failure) /1187(55℃ Max) → 20.xx% | 20.xx% > 20% | Abnormal |

FIG. 4

| DMD | LED | Temperature senser | Optical sensor calculation | Comparison to failure reference value | Result value |
|---|---|---|---|---|---|
| On | ON | 25℃ | 1382(No mirror failure) /1382(25℃ Max) → 100% | 100% > 80% | Normal |
| On | ON | 25℃ | 1200(Some light is measured by optical sensor because of mirror failure) /1382(25℃ Max) → 87% | 87% > 80% | Normal |
| On | ON | 25℃ | 1000(Some light is not measured by optical sensor because of mirror failure) /1382(25℃ Max) → 72% | 72% < 80% | Abnormal |
| On | ON | 55℃ | 1000(Some light is not measured by optical sensor because of mirror failure) /1382(55℃ Max) → 84% | 84% > 80% | Normal |

FAILURE DETERMINATION SYSTEM FOR A LIGHTING APPARATUS

CROSS-REFERENCE TO RELATED APPLICATION

The present application claims priority to and the benefit of Korean Patent Application No. 10-2023-0132744, filed Oct. 5, 2023, the entire contents of which are incorporated herein by reference.

BACKGROUND

1. Technical Field

The present disclosure relates to a failure determination system for a lighting apparatus that forms an image on a road surface.

2. Description of the Related Art

In general, when a mobility device (e.g., a vehicle) travels, a headlamp emits light in the traveling direction of the mobility device to illuminate the path ahead. When traveling at night, the headlamp emits light forward to provide visual information to a driver of the mobility device (hereinafter referred to as a vehicle). Thus, forward visibility at night is secured, and other vehicles and obstacles on the road can be viewed for safe traveling.

Recently, a function of forming particular images on a road surface using light emitted from a headlamp to provide messages to nearby pedestrians or vehicles has been developed. For this end, a projection lamp is applied to a vehicle, and light emitted from the projection lamp forms images on a road surface.

For the projection lamp, a digital micromirror device (DMD) is applied to form images through the reflection of light.

However, if the DMD malfunctions, the visibility of projected images is reduced. In the related art, there is no way to recognize the occurrence of failure of the DMD. Even if operational errors of the DMD occur, it is impossible to recognize the errors.

The foregoing is intended merely to aid in the understanding of the background of the present disclosure. The foregoing is not intended to mean that the present disclosure falls within the purview of the related art that is already known to those having ordinary skill in the art.

SUMMARY

The present disclosure provides a failure determination system for a lighting apparatus. The failure determination system is configured to determine whether, in the lighting apparatus for forming an image on a road surface, a reflection unit for generating an image has failed, and warns of the failure.

Embodiments of the present disclosure provide a failure determination system for a lighting apparatus. The failure determination system includes: a light source unit provided in a housing and configured to emit light; and a reflection unit positioned so that the light emitted from the light source unit is incident on the reflection unit. The reflection unit is configured to generate a projected image by reflecting the incident light selectively depending on a reflection angle. The failure determination system also includes an optical sensor spaced apart from the reflection unit in the housing and configured to sense an amount of incident light. Additionally, the failure determination system includes a controller configured to control the reflection unit, and determine whether the reflection unit has failed, based on an amount of light sensed by the optical sensor during failure determination.

During failure determination, the controller may be configured to make the reflection unit operate in a preset failure determination mode so that a direction of light reflection is fixed to any one direction.

The controller may be further configured to classify operation for determination of failure of the reflection unit into a plurality of operating conditions. Different amounts of light for determining whether the reflection unit has failed may be set depending on the respective operating conditions.

The failure determination system may further include a temperature sensor provided in the housing and configured to measure a heating temperature of the light source unit. The controller may be further configured to preset a set temperature range for failure determination to determine whether the reflection unit has failed in the set temperature range.

In a first operating condition among the operating conditions for failure determination, the controller may be configured to control the reflection unit such that the direction of light reflection by the reflection unit is away from the optical sensor.

The controller may be further configured to pre-store the set temperature range and a first amount of light for failure determination according to the first operating condition. The set temperature range may be set to a temperature at which the light source unit operates normally, and the first amount of light may be set based on a condition in which light is not incident while the light source unit operates normally.

While the reflection unit is in the first operating condition and the temperature of the light source unit satisfies the set temperature range, the controller may be configured to determine that the reflection unit is normal when the amount of light sensed by the optical sensor is equal to or smaller than the first amount of light. Alternatively, the controller may be configured to determine that the reflection unit is abnormal when the amount of light sensed by the optical sensor is greater than the first amount of light.

While the reflection unit is in the first operating condition and the temperature of the light source unit is greater than the set temperature range, the controller may be configured to determine that the reflection unit is abnormal when the amount of light sensed by the optical sensor is greater than the first amount of light. Alternatively, the controller may be configured to determine that the reflection unit is normal when the amount of light sensed by the optical sensor is equal to or smaller than the first amount of light.

In a second operating condition among the operating conditions for failure determination, the controller may be configured to control the reflection unit such that the direction of light reflection by the reflection unit may be toward the optical sensor.

The controller may be further configured to pre-store the set temperature range and a second amount of light for failure determination according to the second operating condition. The set temperature range may be set to a temperature at which the light source unit operates normally, and the second amount of light is set based on a condition in which light may be incident while the light source unit operates normally.

While the reflection unit is in the second operating condition and the temperature of the light source unit satisfies the set temperature range, the controller may be configured to determine that the reflection unit is normal when the amount of light sensed by the optical sensor is equal to or greater than the second amount of light. Alternatively, the controller may be configured to determine that the reflection unit is abnormal when the amount of light sensed by the optical sensor is less than the second amount of light.

While the reflection unit is in the second operating condition and the temperature of the light source unit is greater than the set temperature range, the controller may be configured to determine that the reflection unit is normal when the amount of light sensed by the optical sensor is greater than the second amount of light.

The controller may be further configured to determine whether the reflection unit has failed for each of the plurality of operating conditions. When it is determined that the reflection unit is abnormal for only one of the operating conditions, a failure warning may be determined. Alternatively, when it is determined that the reflection unit is abnormal for all the operating conditions, a definite failure may be determined.

The light source unit may include a light source and a reflector and may be placed at a lower portion of the housing. The reflection unit may include multiple mirrors of which reflection angles are switched depending on whether the reflection unit is turned on or off. The reflection unit may be placed above the light source unit. The optical sensor may be placed above the reflection unit such that light reflecting off the reflection unit depending on whether the reflection unit is turned on or off is selectively incident on the optical sensor above the reflection unit.

A temperature sensor configured to measure a heating temperature of the light source unit may be further provided in the housing. The temperature sensor may be provided at the light source of the light source unit.

The failure determination system, which has the structure described above, for the lighting apparatus, determines whether the reflection unit, which forms a projected image by reflecting off light emitted from the light source, has failed. As a result, the failure determination system leads to the normalization of the reflection unit and enables the visibility of a projected image to be maintained.

BRIEF DESCRIPTION OF THE DRAWINGS

The above and other objects, features, and advantages of the present disclosure should be more apparent from the following detailed description taken in conjunction with the accompanying drawings:

FIG. 3 is a diagram illustrating determination of failure of a reflection unit according to a first embodiment in a failure determination system for a lighting apparatus of the present disclosure; and FIG. 4 is a diagram illustrating determination of failure of a reflection unit according to a second embodiment in a failure determination system for a lighting apparatus of the present disclosure.

DETAILED DESCRIPTION

Figure 1:
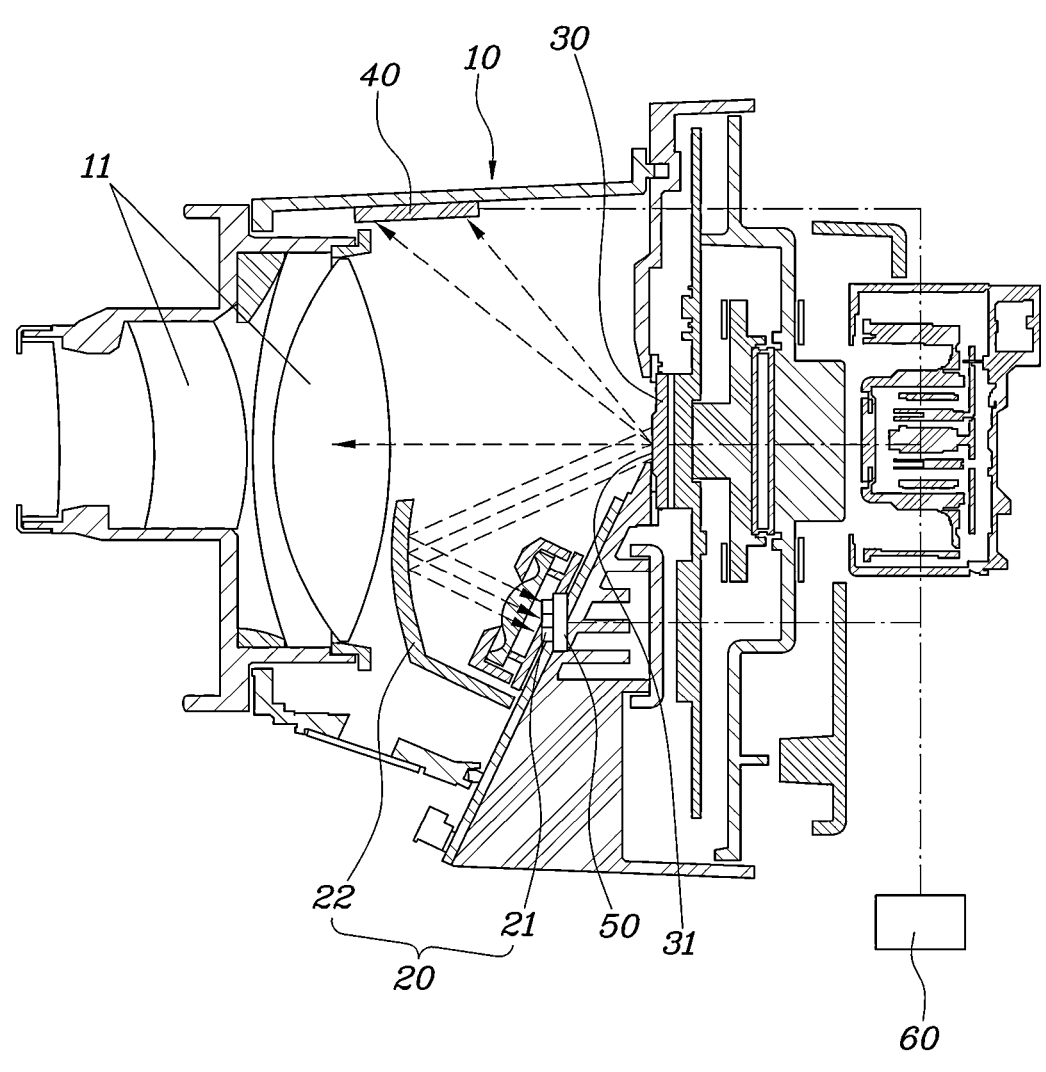
FIG. 1 is a diagram illustrating a failure determination system for a lighting apparatus according to an embodiment of the present disclosure.

Hereinafter, embodiments described in the present specification are described in detail with reference to the accompanying drawings. Throughout the drawings, like or similar elements are denoted by the same reference numerals, and redundant descriptions thereof have been omitted.

The suffixes "module" and "part" for elements used in the following description are given or used interchangeably only for the sake of ease in drafting the specification, and do not have distinctive meanings or roles by themselves.

In describing an embodiment disclosed in the present specification, if it is determined that a detailed description of the known art related to the present disclosure makes the subject matter of the embodiment disclosed in the present specification unclear, the detailed description is omitted. In addition, the accompanying drawings are only to enhance understanding of the embodiments disclosed in the present specification, and do not limit the technical idea disclosed in the present specification. In addition, it should be understood that the present disclosure includes all modifications, equivalents, and substitutions included in the spirit and the scope of the present disclosure.

The terms "first," "second," and the like used in the specification can be used to describe various elements, but the elements are not to be construed as being limited to the terms. The terms are only used to differentiate one element from other elements.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

As used herein, the singular forms "a," "an," and "the" are intended to include the plural forms as well, unless the context clearly indicates otherwise.

In the present specification, it should be understood that terms such as "including," "having," and the like are intended to indicate the existence of the features, numbers, steps, actions, elements, parts, or combinations thereof disclosed in the specification. The terms are not intended to preclude the possibility that one or more other features, numbers, steps, actions, elements, parts, or combinations thereof may exist or may be added.

It should be understood that the terms "vehicle" or "vehicular" or other similar terms as used herein are inclusive of motor vehicles in general. Such motor vehicles may include sports utility vehicles (SUV), buses, trucks, various commercial vehicles, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, e.g., a vehicle that is both gasoline-powered and electric-powered.

A controller may include a communication device for communicating with other controllers or a sensor so as to control a function in charge. A controller may also include a memory storing operating system or logic instructions and input/output information. Additionally, the controller may include at least one processor performing determination, operation, and decision required for controlling a function in charge.

When a component, device, element, or the like of the present disclosure is described as having a purpose or performing an operation, function, or the like, the component, device, or element should be considered herein as being "configured to" meet that purpose or perform that operation or function.

Hereinafter, a failure determination system for a lighting apparatus according to an embodiment of the present disclosure is described with reference to the accompanying drawings.

As shown in FIG. 1, a failure determination system for a lighting apparatus according to the present disclosure includes a light source unit 20 provided in a housing 10, and configured to emit light. The failure determination system further includes a reflection unit 30 positioned so that the light emitted from the light source unit 20 is incident on the reflection unit 30, and configured to generate a projected image by reflecting the incident light selectively depending on a reflection angle. The failure determination system also includes an optical sensor 40 spaced apart from the reflection unit 30 in the housing 10, and configured to sense the amount of incident light. Additionally, the failure determination system includes a controller 60 configured to control the reflection unit 30, and determine whether the reflection unit 30 has failed based on the amount of light sensed by the optical sensor 40 during failure determination.

The present disclosure is applicable to a headlamp of a vehicle. In the case of application to the headlamp, the housing 10 may be provided at a front portion of the vehicle.

In the housing 10, an imaging lens 11 composed of a plurality of lenses may be provided.

The light source unit 20 may include a light source 21 and a reflector 22. Herein, the light source 21 may be composed of a light-emitting diode (LED). The light emitted from the light source 21 may reflect off the reflector 22 and may move to the reflection unit 30.

The reflection unit 30 is a digital micromirror device (DMD) composed of multiple mirrors (31). The angle of each mirror is adjusted through on-off switching control, so the moving direction of light emitted from the light source unit 20 is switched.

The optical sensor 40 is provided inside the housing 10 and is spaced apart from the reflection unit 30 and the imaging lens 11. The optical sensor 40 is configured to sense the amount of light, and may be placed such that when the reflection unit 30 operates abnormally or is stuck in an abnormal position, the light reflecting off the reflection unit 30 is incident on the optical sensor 40.

Accordingly, the light source unit 20 may be placed at a lower portion of the housing 10, the reflection unit 30 may be placed above the light source unit 20, and the optical sensor 40 may be placed above the reflection unit 30. Thus, the light emitted from the light source unit 20 may be incident on the reflection unit 30, and depending on the reflection angle of the reflection unit 30, the light may be emitted to the outside through the imaging lens 11 or may move toward the optical sensor 40.

In the housing 10, a temperature sensor 50 may be provided to measure the heating temperature of the light source unit 20.

The temperature sensor 50 may be provided adjacent to the light source unit 20 in the housing 10. In addition, the temperature sensor 50 may be provided on a printed circuit board (PCB) that is a component of the light source 21, in order to measure the junction temperature of the light source 21 of the light source unit 20. In other words, the temperature that affects the optical performance of the light emitted from the light source unit 20 is not the external temperature but the junction temperature that affects the performance of the light source 21, which is an LED. Therefore, the temperature sensor 50 may be provided on the PCB on which the light source 21 is provided in the light source unit 20.

Through this, while controlling the reflection unit 30, the controller 60 may determine whether the reflection unit 30 has failed based on the amount of light measured by the optical sensor 40 and the temperature of the light source unit 20 measured by the temperature sensor 50.

In other words, while operating the reflection unit 30 in a particular condition, the controller 60 determines whether the reflection unit 30 has failed based on the amount of light sensed by the optical sensor 40.

In addition, because the light source unit 20 changes the amount of light depending on a temperature condition, the controller 60 further determines whether the reflection unit 30 has failed based on both the amount of light sensed by the optical sensor 40 and the temperature condition of the light source unit 20.

Thus, according to the present disclosure, it may be determined whether the reflection unit 30 has failed, based on the temperature of the light source unit 20 and the amount of light sensed by the optical sensor 40. When it is determined that the reflection unit 30 has failed, a message may be delivered through a warning light or warning sound for normalization of the reflection unit 30.

Describing the present disclosure in detail, during failure determination, the controller 60 makes the reflection unit 30 operate in a present failure determination mode so that a direction of light reflection is fixed to any one direction.

The reflection unit 30 is composed of multiple mirrors, and some of the mirrors may fail or become stuck.

Accordingly, when performing failure determination, the controller 60 makes the multiple mirrors of the reflection unit operate in the preset failure determination mode, so that all the mirrors operate at the same reflection angle, thereby determining whether there is a failed or stuck mirror.

For example, the controller 60 controls the reflection unit 30 so that the direction of light reflected by the reflection unit 30 is toward the optical sensor 40, and the optical sensor 40 senses an amount of the reflected light (i.e., an amount of incident light onto the optical sensor 40). The controller 60 pre-stores the following information therein: information on an amount of reflected light which is sensed by the optical sensor when the reflection unit 30 is normal and the light reflected by the reflection unit 30 is controlled to be directed to the optical sensor 40. While performing failure determination, the controller 60 may recognize that some mirrors of the reflection unit 30 are abnormal when the amount of the reflected light sensed by the optical sensor 40 is different from the pre-stored information of the amount of the reflected light.

In other words, in order to determine the failure of the reflection unit 30, the multiple mirrors of the reflection unit 30 operate at the same reflection angle, and it is determined whether the reflection unit 30 has failed depending on the amount of light measured by the optical sensor 40.

The controller 60 may classify the operation for the determination of failure of the reflection unit 30 into a plurality of operating conditions. Different amounts of light for determining whether there is a failure may be set depending on the respective operating conditions (i.e., the classified operating conditions).

During failure determination, the controller 60 makes the reflection unit 30 operate for failure determination, and classifies the operation for failure determination into a plurality of operating conditions. As a result, the controller 60 accurately determines whether the reflection unit 30 has failed. The reflection angle of the reflection unit 30 is switched based on whether the reflection unit 30 is switched on or off. Because each mirror of the reflection unit 30 may fail in an on state or may fail in an off state, the operation conditions for the failure determination of the reflection unit 30 are classified based on the on and off states of the reflection unit 30.

In addition, the direction of light reflection differs depending on the on state or the off state of the reflection unit 30. As a result, the controller 60 may set a plurality of amounts of light to determine whether there is a failure depending on each operating condition of the reflection unit 30.

Through this, in determining whether the reflection unit 30 has failed, while the reflection unit 30 operates in a particular operating condition, the amount of light sensed by the optical sensor 40 may be used to determine whether the reflection unit 30 has failed.

As described below in detail, as a first embodiment, in the case of a first operating condition among operating conditions for failure determination, the controller 60 may control the reflection unit 30 such that the direction of light reflection by the reflection unit 30 is not toward (e.g., away from) the optical sensor 40.

In other words, in the determination of the failure of the reflection unit 30, the controller 60 makes the reflection unit 30 operate in the first operating condition. The first operating condition is pre-stored. In the first operating condition, each mirror is controlled such that the light reflection direction of the reflection unit 30 is not toward the optical sensor 40. All the mirrors are controlled at the same reflection angle, and the light reflecting off the reflection unit 30 moves to the imaging lens 11 or the lower portion of the housing 10.

The controller 60 pre-stores a set temperature range and a first amount of light for failure determination according to the first operating condition. The set temperature range may be set to a temperature at which the light source unit 20 operates normally. The first amount of light may be set based on a condition that light is not incident on the optical sensor 40 while the light source unit 20 operates normally.

Regarding the set temperature range, different temperature ranges may be set depending on the specifications of the light source unit 20. The set temperature range may be determined depending on the amount of emitted light, which decreases or increases under the influence of the temperature of the light source unit 20.

Figure 2:
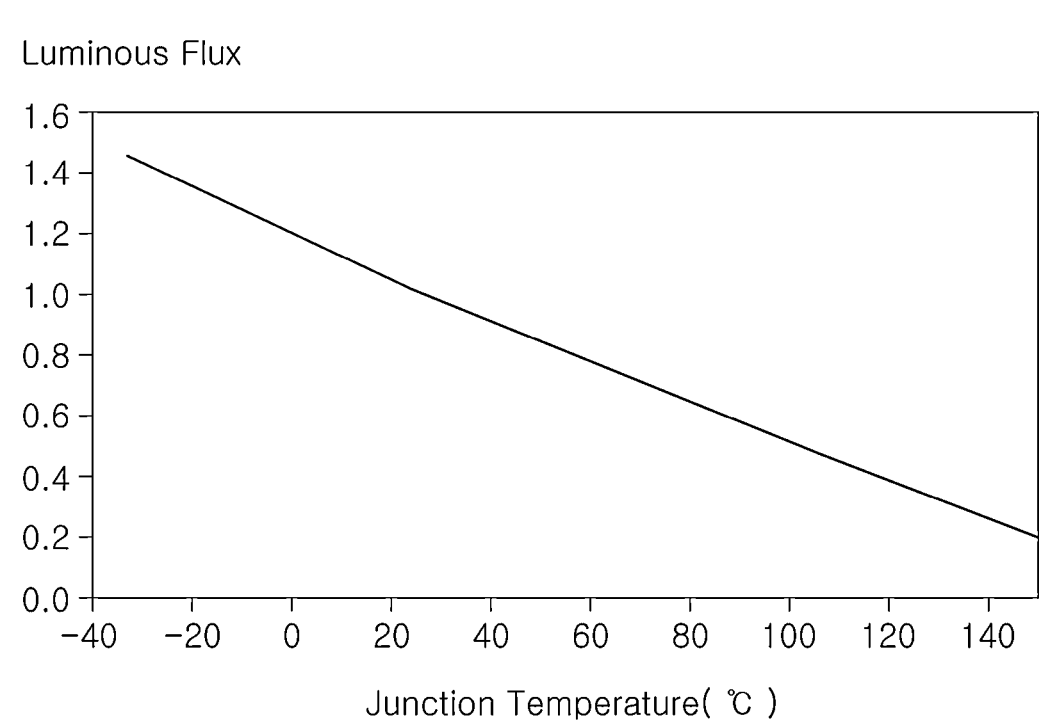
FIG. 2 is a diagram illustrating an amount of light according to a temperature of a light source unit.

In other words, referring to FIG. 2, it can be seen that compared to when the temperature of the light source unit 20 is 25° C., when the temperature of the light source unit 20 decreases to −40° C., the amount of light increases by 1.5 times, and when the temperature of the light source unit 20 increases to 140° C., the amount of light decreases to 75%. In addition, even when the light emitted from the light source unit 20 reflects off the reflection unit 30, the actual loss of the amount of light is greatly influenced by the temperature of the light source unit 20, so the temperature condition of the light source unit 20 needs to be considered.

The first amount of light is determined depending on the amount of light that is incident after light emitted from the light source unit 20 reflects off the reflection unit 30. The first amount of light may be determined based on the first operating condition of the reflection unit 30 in which light is not incident on the optical sensor 40 while the light source unit 20 operates normally.

Accordingly, while the reflection unit 30 is in the first operating condition and the temperature of the light source unit 20 satisfies the set temperature range, the controller 60 determines that the reflection unit 30 is normal when the amount of light sensed by the optical sensor 40 is equal to or less than the first amount of light. Alternatively, the controller 60 determines that the reflection unit 30 is abnormal when the amount of light sensed by the optical sensor 40 is greater than the first amount of light.

In other words, in the determination of the failure of the reflection unit 30, the controller 60 makes the reflection unit 30 operate in the first operating condition so that the light reflecting off the reflection unit 30 is not toward the optical sensor 40. Based on the first amount of light pre-stored for failure determination when the reflection unit 30 operates in the first operating condition, the controller 60 compares the amount of light sensed by the optical sensor 40 to the first amount of light.

For example, the controller 60 may set, as a reference value, the amount of light greater by about 20% than the first amount of light according to the first operating condition when both the light source unit 20 and the reflection unit 30 operate normally. In other words, in the first operating condition of the reflection unit 30, when both the first light source unit 20 and the reflection unit 30 are normal, the first amount of light is about 0%, and through a prior experiment, the normal range for the reflection unit 30 may be set to about 20%.

Accordingly, when the set temperature range is satisfied and the light source unit 20 and the reflection unit 30 operate normally, the amount of light sensed by the optical sensor 40 converges to 0%. As a result, the controller 60 determines that the reflection unit 30 is normal. When the amount of light sensed by the optical sensor 40 is equal to or less than 20% although some mirrors of the reflection unit 30 have failed, it is determined that the reflection unit 30 is normal.

However, when the amount of light sensed by the optical sensor 40 exceeds 20% as each mirror of the reflection unit 30 has failed or is stuck, the visibility of a projected image obtained from the light emitted from the light source unit 20 and reflecting off the reflection unit 30 may be reduced. Thus, it is determined that the reflection unit 30 is abnormal.

While the reflection unit 30 is in the first operating condition, the temperature of the light source unit 20 is greater than the set temperature range, and the amount of light sensed by the optical sensor 40 is greater than the first amount of light, the controller 60 may determine that the reflection unit 30 is abnormal.

When the temperature of the light source unit 20 is greater than the set temperature range, the amount of light emitted from the light source unit 20 is reduced. In this way, although the amount of light emitted from the light source unit 20 is reduced, when the amount of light sensed by the optical sensor 40 is greater than the first amount of light, it may be determined that the reflection unit 30 is abnormal.

In addition, when the temperature of the light source unit 20 is greater than the set temperature range and the amount of light sensed by the optical sensor 40 is less than the first amount of light, despite the fact that the reflection unit 30 is normal, it may be erroneously determined that the reflection unit 30 is abnormal. This is because of a reduction in the amount of light from the light source unit 20. Therefore, in the case in which the reflection unit 30 operates in the first operating condition, although the temperature of the light source unit 20 is greater than the set temperature range, when the first amount of light is not exceeded, it is determined that the reflection unit 30 is normal.

As shown in the table of FIG. 3, as the first embodiment, while the reflection unit 30 operates in the first operating condition, it may be determined whether the reflection unit 30 is normal or abnormal, depending on the amount of light by temperature.

As a second embodiment, in the case of a second operating condition among operating conditions for failure determination, the controller 60 may control the reflection unit 30 such that the direction of light reflection by the reflection unit 30 is toward the optical sensor 40.

In other words, in the determination of the failure of the reflection unit 30, the controller 60 makes the reflection unit 30 operate in the second operating condition. The second operating condition is pre-stored. In the second operating condition, each mirror is controlled such that the light reflection direction of the reflection unit 30 is toward the optical sensor 40, and all the mirrors are controlled at the same reflection angle.

The controller 60 pre-stores a set temperature range and a second amount of light for failure determination according to the second operating condition. The set temperature range may be set to a temperature at which the light source unit 20 operates normally. The second amount of light may be set based on a condition that light is incident while the light source unit 20 operates normally.

Regarding the set temperature range, different temperature ranges may be set depending on the specifications of the light source unit 20. The set temperature range may be determined depending on the amount of emitted light, which decreases or increases under the influence of the temperature of the light source unit 20.

The second amount of light is determined depending on the amount of light that is incident after light emitted from the light source unit 20 reflects off the reflection unit 30. The second amount of light may be determined based on the second operating condition of the reflection unit 30 in which light is incident on the optical sensor 40 while the light source unit 20 operates normally.

Accordingly, while the reflection unit 30 is in the second operating condition and the temperature of the light source unit 20 satisfies the set temperature range, the controller 60 determines that the reflection unit 30 is normal when the amount of light sensed by the optical sensor 40 is equal to or greater than the second amount of light. Alternatively, the controller 60 determines that the reflection unit 30 is abnormal when the amount of light sensed by the optical sensor 40 is less (e.g., smaller) than the second amount of light.

In other words, in the determination of the failure of the reflection unit 30, the controller 60 makes the reflection unit 30 operate in the second operating condition so that the light reflecting off the reflection unit 30 is toward the optical sensor 40. Based on the second amount of light pre-stored for failure determination when the reflection unit 30 operates in the second operating condition, the controller 60 compares the amount of light sensed by the optical sensor 40 to the second amount of light.

For example, the controller 60 may set, as a reference value, the amount of light smaller by 80% than the second amount of light according to the second operating condition when both the light source unit 20 and the reflection unit 30 operate normally. In other words, in the second operating condition of the reflection unit 30, when both the second light source unit 20 and the reflection unit 30 are normal, the second amount of light is about 100%, and through a prior experiment, the normal range for the reflection unit 30 may be set to about 80%.

Accordingly, when the set temperature range is satisfied and the light source unit 20 and the reflection unit 30 operate normally, the amount of light sensed by the optical sensor 40 converges to 100%, so the controller 60 determines that the reflection unit 30 is normal. When the amount of light sensed by the optical sensor 40 is equal to or greater than 80% although some mirrors of the reflection unit 30 have failed, it is determined that the reflection unit 30 is normal.

However, when the amount of light sensed by the optical sensor 40 is less than 80% as each mirror of the reflection unit 30 has failed or is stuck, the visibility of a projected image obtained from the light emitted from the light source unit 20 and reflecting off the reflection unit 30 may be reduced. As a result, it is determined that the reflection unit 30 is abnormal.

While the reflection unit 30 is in the second operating condition and the temperature of the light source unit 20 is greater than the set temperature range, when the amount of light sensed by the optical sensor 40 is greater than the second amount of light, the controller 60 may determine that the reflection unit 30 is normal.

When the temperature of the light source unit 20 is greater than the set temperature range, the amount of light emitted from the light source unit 20 is reduced. However, although the amount of light emitted from the light source unit 20 is reduced, when the amount of light sensed by the optical sensor 40 is greater than the second amount of light, it may be determined that the visibility of an image obtained through reflection by the reflection unit 30 is secured and the reflection unit 30 is normal.

In addition, when the amount of light sensed by the optical sensor 40 is less than the second amount of light while the temperature of the light source unit 20 is greater than the set temperature range, the visibility of an image obtained through reflection by the reflection unit 30 is reduced. As a result, it is determined that the reflection unit 30 is abnormal.

As shown in the table of FIG. 4, as an embodiment, while the reflection unit 30 operates in the second operating condition, it may be determined whether the reflection unit 30 is normal or abnormal, depending on the amount of light by temperature.

When the temperature of the light source unit 20 is lower than the set temperature range, the light efficiency of the light source unit 20 is improved. Accordingly, when the temperature of the light source unit 20 is lower than the set temperature range, the visibility of a projected image generated through reflection by the reflection unit 30 is secured and the determining of whether the reflection unit 30 has failed is not performed. In addition, when the temperature of the light source unit 20 is lower than the set temperature range, the first amount of light is corrected to be a lower value, and the second amount of light is corrected to be a higher value, it may be determined whether the reflection unit 30 has failed according to the temperature of the light source unit 20.

The controller 60 checks for failure for each of the plurality of operating conditions. When it is determined that the reflection unit 30 is abnormal for only one of the operating conditions, a failure warning is determined. When it is determined that the reflection unit 30 is abnormal for all of the operating conditions, a definite failure is determined.

In the present disclosure, the plurality of operating conditions of the reflection unit 30 are stored in the controller 60, and checking for failure is performed for each of the operating conditions. In particular, in the present disclosure, the operating conditions of the reflection unit 30 may be classified into the first operating condition and the second operating condition.

Accordingly, the controller 60 recognizes the following results: a result of determining whether the reflection unit 30 is normal, by comparing the amount of light sensed by the optical sensor 40 to the first amount of light in the first operating condition of the reflection unit 30; and a result of determining whether the reflection unit 30 is normal, by comparing the amount of light sensed by the optical sensor 40 to the second amount of light in the second operating condition of the reflection unit 30. When the reflection unit 30 is abnormal for only one of the operating conditions, a corresponding message may be delivered to a user as a failure warning. When the reflection unit 30 is abnormal for all of the operating conditions, a corresponding message may be delivered as a definite failure.

In this way, according to the present disclosure, in determining whether the reflection unit 30 has failed, determination results are classified into a failure warning and a definite failure, and a message is delivered to a user. As a result, the user recognizes the safety risk caused by the deterioration of the lamp function and is guided to have the reflection unit 30 repaired.

The failure determination system, which has the structure described above, for the lighting apparatus, determines whether the reflection unit 30, which forms a projected image by reflecting off light emitted from the light source, has failed. As a result, the determination system leads to the normalization of the reflection unit 30 and enables the visibility of a projected image to be maintained.

Although a particular embodiment of the present disclosure has been described for illustrative purposes, those having ordinary skill in the art should appreciate that various modifications, additions, and substitutions are possible, without departing from the technical idea of the disclosure as disclosed in the accompanying claims.

The invention claimed is:

1. A failure determination system for a lighting apparatus, the failure determination system comprising:

a light source unit provided in a housing and configured to emit light;

a reflection unit, wherein the light emitted from the light source unit is incident on the reflection unit, and the reflection unit is configured to generate a projected image by reflecting the incident light selectively based on a reflection angle;

an optical sensor spaced apart from the reflection unit in the housing and configured to sense an amount of incident light; and a controller configured to control the reflection unit and determine whether the reflection unit has failed, based on the amount of the incident light sensed by the optical sensor during failure determination, wherein during failure determination, the controller is configured to operate the reflection unit in a preset failure determination mode so that light reflected by the reflection unit is directed in one direction.

2. The failure determination system of claim 1, wherein the controller is further configured to classify operation for determining a failure of the reflection unit into a plurality of operating conditions, and wherein different amounts of light for determining whether the reflection unit has failed are set based on the respective operating conditions.

3. The failure determination system of claim 2, further comprising: a temperature sensor provided in the housing and configured to measure a heating temperature of the light source unit, wherein the controller is further configured to preset a set temperature range for failure determination to determine whether the reflection unit has failed in the set temperature range.

4. The failure determination system of claim 3, wherein in a second operating condition among the operating conditions for failure determination, the controller is configured to control the reflection unit such that the light reflected by the reflection unit is directed toward the optical sensor.

5. The failure determination system of claim 4, wherein:

the controller is further configured to pre-store the set temperature range and a second amount of light for failure determination according to the second operating condition, the set temperature range is set to a temperature at which the light source unit operates normally, and the second amount of light is set based on a condition in which light is incident on the optical sensor while the light source unit operates normally.

6. The failure determination system of claim 5, wherein while the reflection unit is in the second operating condition and the temperature of the light source unit satisfies the set temperature range, the controller is configured to:

determine that the reflection unit is normal when the amount of incident light sensed by the optical sensor is equal to or greater than the second amount of light, and determine that the reflection unit is abnormal when the amount of incident light sensed by the optical sensor is less than the second amount of light.

7. The failure determination system of claim 5, wherein while the reflection unit is in the second operating condition and the temperature of the light source unit is greater than the set temperature range, the controller is configured to determine that the reflection unit is normal when the amount of incident light sensed by the optical sensor is greater than the second amount of light.

8. The failure determination system of claim 3, wherein in a first operating condition among the plurality of operating conditions, the controller is configured to control the reflection unit such that the light reflected by the reflection unit is not directed toward the optical sensor.

9. The failure determination system of claim 8, wherein:

the controller is further configured to pre-store the set temperature range and a first amount of light for failure determination according to the first operating condition, the set temperature range is set to a temperature at which the light source unit operates normally, and the first amount of light is set based on a condition in which light is not incident on the optical sensor while the light source unit operates normally.

10. The failure determination system of claim 9, wherein while the reflection unit is in the first operating condition and the temperature of the light source unit satisfies the set temperature range, the controller is configured to:

determine that the reflection unit is normal when the amount of incident light sensed by the optical sensor is equal to or less than the first amount of light, and determine that the reflection unit is abnormal when the amount of incident light sensed by the optical sensor is greater than the first amount of light.

11. The failure determination system of claim 9, wherein while the reflection unit is in the first operating condition and the temperature of the light source unit is greater than the set temperature range, the controller is configured to:

determine that the reflection unit is abnormal when the amount of incident light sensed by the optical sensor is greater than the first amount of light, and determine that the reflection unit is normal when the amount of incident light sensed by the optical sensor is equal to or less than the first amount of light.

12. The failure determination system of claim 2, wherein the controller is further configured to determine whether the reflection unit has failed for each of the plurality of operating conditions, and when it is determined that the reflection unit is abnormal for only one of the operating conditions, a failure warning is determined, or when it is determined that the reflection unit is abnormal for all the operating conditions, a definite failure is determined.

13. The failure determination system of claim 1, wherein the light source unit comprises a light source and a reflector and is placed at a lower portion of the housing, wherein the reflection unit comprises multiple mirrors, and reflection angles of the multiple mirrors are switched depending on whether the reflection unit is turned on or off, and is placed above the light source unit, and wherein the optical sensor is placed above the reflection unit such that light reflected by the reflecting unit depending on whether the reflection unit is turned on or off is selectively incident on the optical sensor.

14. The failure determination system of claim 13, further comprising: a temperature sensor configured to measure a heating temperature of the light source unit is further provided in the housing, and wherein the temperature sensor is provided at the light source unit.

* * * * *